United States Patent [19]

Morita

[11] Patent Number: 4,673,821
[45] Date of Patent: Jun. 16, 1987

[54] PHOTOELECTRIC CONVERTER DEVICE HAVING REDUCED OUTPUT NOISE

[75] Inventor: Keitoku Morita, Kagoshima, Japan

[73] Assignee: Kyocera Corporation, Kyoto, Japan

[21] Appl. No.: 654,766

[22] Filed: Sep. 26, 1984

[30] Foreign Application Priority Data

Sep. 27, 1983 [JP] Japan .................................. 58-179801
Dec. 29, 1983 [JP] Japan .................................. 58-248138

[51] Int. Cl.$^4$ ......................... H04N 3/14; H04N 5/335
[52] U.S. Cl. ............................... 250/578; 358/213.15; 358/294
[58] Field of Search ................ 250/578, 209; 358/212, 358/213, 167

[56] References Cited

U.S. PATENT DOCUMENTS

| | | | |
|---|---|---|---|
| 4,413,188 | 12/1983 | Ozawa et al. | 250/578 |
| 4,424,590 | 1/1984 | Ozawa | 358/213 |
| 4,495,523 | 1/1985 | Ozawa | 358/213 |
| 4,511,804 | 4/1985 | Ozawa | 358/213 |
| 4,566,040 | 1/1986 | Ozawa et al. | 358/213 |

OTHER PUBLICATIONS

Contact-Type Linear Sensor Using Amorphous Si Diode Array Japanese Journal of Applied Physics, vol. 22(1983) Supp. 22-1, pp. 457-460—Kiyoshi Ozawa, et al.

Amorphous Silicon Image Sensor—Electronics Dec. 1982, pp. 59-62 (together with its partial English Translation—Takashi Ozawa.

Primary Examiner—David C. Nelms
Assistant Examiner—S. Allen
Attorney, Agent, or Firm—Spensley Horn Jubas & Lubitz

[57] ABSTRACT

A photoelectric converter element is constituted by an electrical charge storage capacitor and a photodiode connected in parallel with the capacitor. A plurality of the photoelectric converter elements are aligned or arranged in a line, each of the photoelectric converter elements has one end thereof connected in series with a switch, a plurality of the photoelectric converter elements have the other ends thereof commonly connected with a line, and the common line is connected with a series circuit including a resistor and a d-c power source. When the switch is turned off, an electric charge stored in the storage capacitor is discharged correspondingly to amount of light received by the photodiode. On the contrary, when the switch is selectively turned on, the storage capacitor is charged with an electric charge corresponding to amount of discharge. Electric signals representing the amount of charge is then supplied to the common line.

17 Claims, 10 Drawing Figures

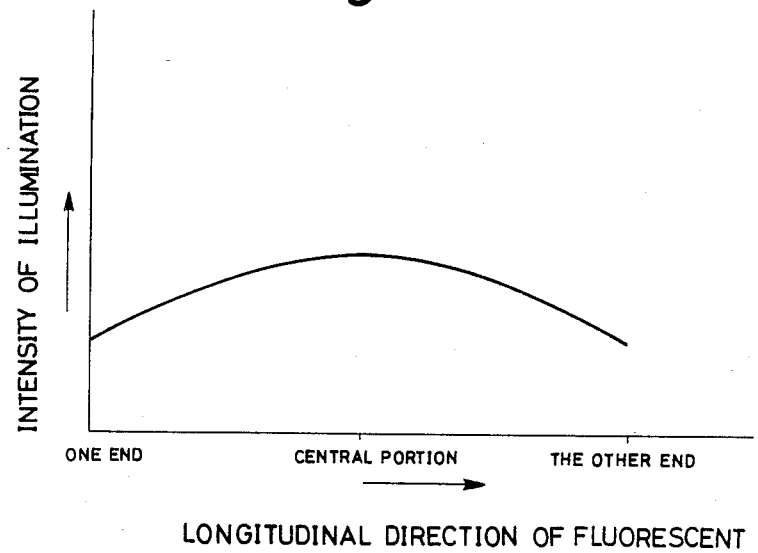

4,673,821

PHOTOELECTRIC CONVERTER DEVICE HAVING REDUCED OUTPUT NOISE

BACKGROUND OF THE INVENTION

1. Field of the Invention

The present invention relates to a photoelectric converter device, and more particularly to improvements in such device using and equipped with one-dimensional line sensors in, for example, image sensor means of the close contact type of a facsimile.

2. Description of the Prior Art

There have been recently developed (a) a photoelectric converter system in which the photoelectric converter element array has a size equal to that of one side of the original, so that there is formed an optical image at the ratio of 1:1 with respect to the respective photoelectric converter elements through the optical fiber array and the lens array, and (b) a photoelectric converter system in which, with the photoelectric converter element array closely contacted with the surface of the original, the original is illuminated through light guide windows in the photoelectric converter element substrate and the reflected light from the original are read by the photoelectric converter elements.

These systems normally use reading circuits of a photoelectric converter system of the electric charge storage type, in which electric signals are supplied through electric charge storage means, as shown in FIGS. 1 and 2.

FIG. 1 illustrates a basic unit for a photoelectric converter system of the electric charge storage type in which a photoelectric converter element 1 has electric charge storage means. When a switch 3 is opened, a bias voltage is applied to a storage capacitor 1b connected in parallel to a photodiode 1a, by a bias power supply 2. A predetermined amount of electric charge is therefore stored in the capacitor 1b. The photodiode 1a receives the reflected light from the original, and electric charge stored in the storage capacitor 1b is discharged correspondingly to the amount of photoelectric conversion made by such light reception. Thereafter, when the analogue switch 3 is suitably closed, a voltage generated at load resistance 4 is sent to an output terminal 5. A slight signal is thus detected. A coupling capacitor 6 is disposed, and the analogue switch 3 has a capacitance 7.

FIG. 2 illustrates the circuit of a photoelectric converter element array in which arranged are in a one-dimensional manner a plurality of the basic units, one of which is shown in FIG. 1.

Driving a shift register 8 causes the analogue switches 3 successively to be opened and closed in time sequence. Electric signals thus sent from the photoelectric converter elements 1 pass through an electrically common output line 10 via the analogue switches 3 respectively corresponding to the photoelectric converter elements 1, and a voltage generated at the load resistance 4 is sent to the output terminal 5.

According to the prior art above-mentioned, it is unavoidable that the control logic signal lines 9 are located adjacent the output line 10. Such arrangement causes noise from the control logic signal lines 9 to be introduced into the output line 10, thereby increasing noise in output signals.

In order to overcome such problem, it is proposed to provide the output line 10 with an electrostatic shield. It is however found from tests conducted by the inventor with such shield used that capacitance was increased between the output line 10 and grounding lines, thereby provoking a decrease in the output voltage.

According to the prior art in FIG. 1, a switching noise generated at the analogue switch 3 flows to the grounding line through the load resistance 4. Such noise is therefore superposed onto an output signal, thereby decreasing the S/N ratio.

SUMMARY OF THE INVENTION

It is an object of the present invention to provide an improved photoelectric converter device capable of eliminating the inconveniences above-mentioned.

It is another object of the invention to provide an improved photoelectric converter device in which an output line commonly used for a photoelectric converting element array is located apart from logic signal lines for analogue switch control connected to respective phohotoelectric converter elements, and in which switching noise generated at analogue switches is guided directly to grounding lines so that the contrast and the S/N ratio are not deteriorated.

It is a further object of the present invention to provide an improved photoelectric converter device capable of reducing a bad influence exerted by capacity on the respective photoelectric converter elements, thereby raising the level of an output signal to improve the S/N ratio.

To accomplish the above objects, a photoelectric converter device according to one aspect of the invention comprises a plurality of photoelectric converter elements having electric charge storage means, being aligned, and actuating the electric charge storage means to discharge upon light-reception, the photoelectric converter elements charged with electric charge corresponding to amount of discharge, said plurality of switches respectively connected in series with one end of the photoelectric converter elements, means for transferring signals representing the amount of charge of the photoelectric converter elements, the signal-transferring means respectively connected with the other ends of the photoelectric converter elements, and the switches rendered conductive successively in time sequence.

In a preferred embodiment, the photoelectric converter elements have the other ends thereof commonly connected with a line and via the common line connected with the signal-transferring means, and the signal-transferring means comprising a series circuit comprises a resistor and a d-c power source.

According to the photoelectric converter device according to the present invention, photoelectric converter elements are connected at one end thereof to switches and at the other ends thereof to electrical signal transferring means. Noise inevitably generated at the switches is therefore guided to the grounding lines so that the noise is not superposed onto an output signal. In a photoelectric converter device achieving such reading fundamental ciucuits arranged in a one-dimensional manner, the signal output line is located apart from the logic signal lines for controlling the switches, so that deterioration of the contrast and S/N ratio can be avoided.

A photoelectric converter device according to another aspect of the invention comprises a plurality of photoelectric converter elements each having electric charge storage means, being aligned, actuating the electric charge storage means to discharge upon light-reception, and electrically divided into a plurality of groups each composed of a smaller plurality of photoelectric converter elements, each of the photoelectric converter elements charged with an electric charge corresponding to amount of discharge, a plurality of switches respectively connected in series with one end of each photoelectric converter element, means for transferring signals representing the amount of charge of the photoelectric converter elements, the plurality of photoelectric converter elements in the each group having the other ends thereof connected commonly with the signal-transferring means, and the switches rendered conductive successively in time sequence.

In another preferred embodiment, the photoelectric converter elements in the each group have the other ends thereof connected commonly with a line, the common line is connected with a resistor, and the resistors of the respective groups are connected commonly with a d-c power source.

In a still another preferred embodiment, outputs from the signal-transferring means in the respective groups are connected with each other, and the signal-transferring means prohibit currents out of other photoelectric converter element groups from entering into the photoelectric converter element group. The signal-transferring means comprises a buffer amplifier.

In yet another preferred embodiment, the photoelectric converter elements are arranged in a first direction intersecting at a right angle with a second direction in which an original to be reproduced in transported, and receive reflected light from the original illuminated by a light source.

Preferably, the number of the photoelectric converter elements in groups located in a first area with a relatively small illumination intensity by the light source is chosen to be smaller than the number of the photoelectric converter elements in groups located in a second area with a relatively great illumination intensity by the light source.

Also preferably, the gain of the buffer amplifier of the groups located in the first area with the relatively small illumination intensity by the light source is chosen to be higher than the gain of the buffer amplifiers of the groups located in the second area with the relatively great illumination intensity by the light source.

Further preferably, the resistance value of the resistors of the groups located in the first area with the relatively small illumination intensity by the light source is chosen to be lower than the resistance value of the resistors of the groups located in the second area with the relatively great illumination intensity by the light source.

As described above, there is provided a photoelectric converter device according to the invention in which a predetermined photoelectric converter element array is electrically divided into a plurality of groups, the respective groups are connected with signal-transferring means, and outputs from the signal-transferring means are connected with each other form the voltages of the signals to be detected, whereby a bad capacitance influence exerted on the respective photoelectric converter elements can be decreased and the voltage of signals can be reamarkably increased, with the result that S/N ratio can be greatly improved. In addition, according to the invention, uneven luminous intensity generated at a line-shaped light source such as a fluorescent lamp may be readily corrected, thus making it possible to provide a highly reliable and excellent photoelectric converter device.

These and other objects, features and advantages of the invention will become more apparent upon a reading of the following detailed specification and drawing:

BRIEF DESCRIPTION OF THE DRAWINGS

FIG. 9 is a graph showing the distribution of the illumination intensity of a fluorescent.

DETAILED DESCRIPTION OF THE PREFERRED EMBODIMENT

Figure 1:
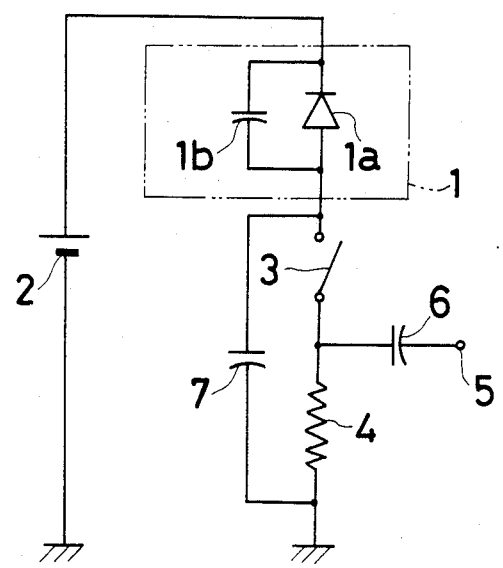
FIG. 1 is a fundamental circuit diagram of the prior photoelectric converter system of the electric charge storage type.
Figure 2:
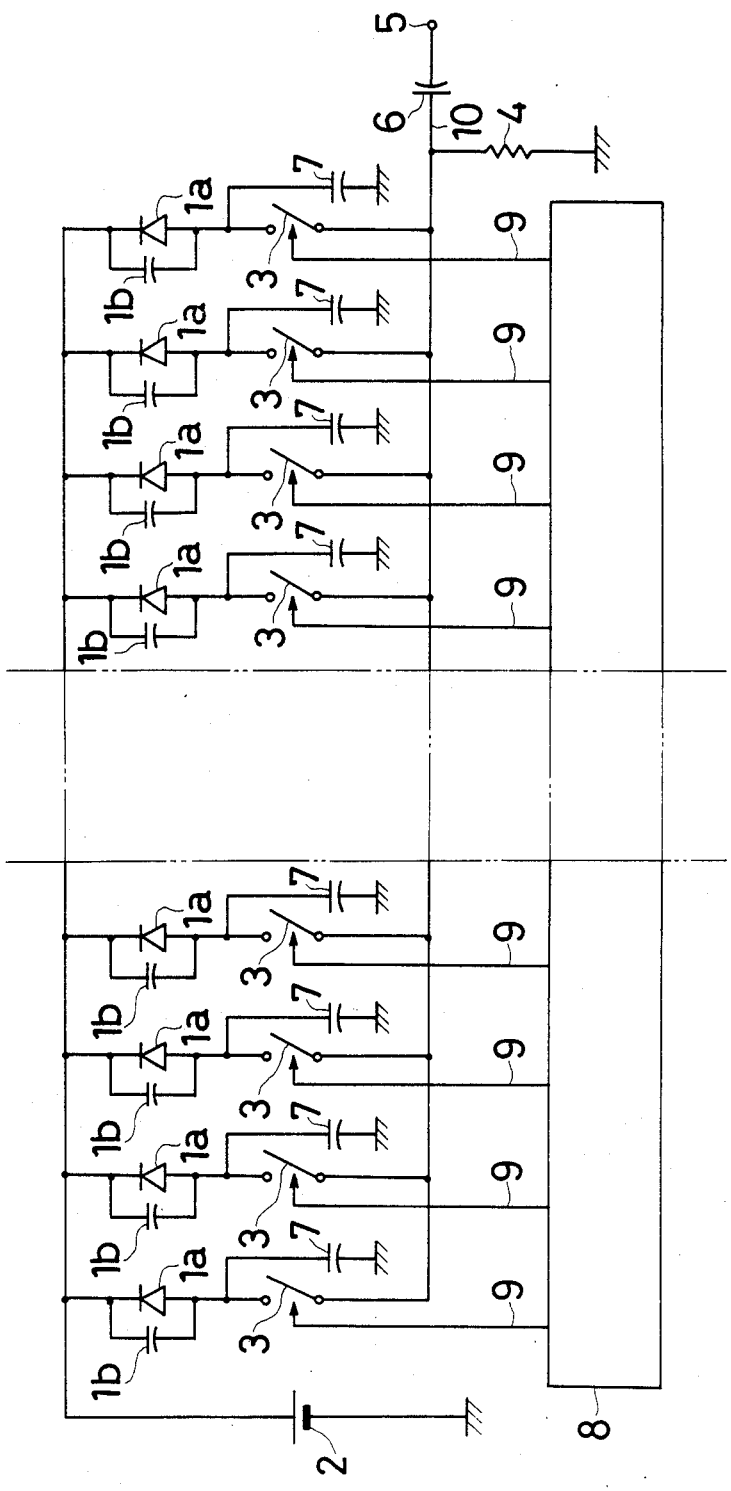
FIG. 2 is a circuit diagram of the prior photoelectric converter element array.
Figure 3A:
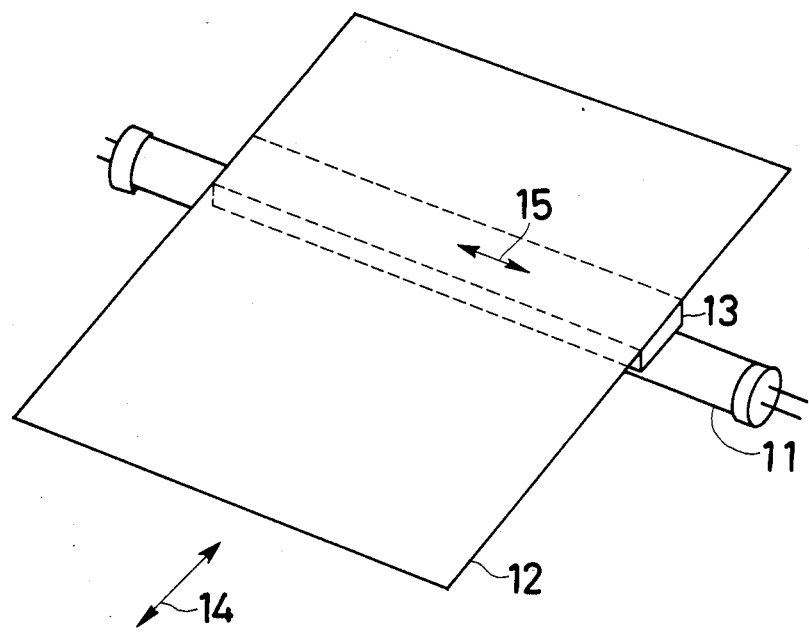
FIGS. 3A and 3B are simplified perspective views showing an embodiment of the inveniton.

FIG. 3A is a perspective view of one embodiment of the invention.

Figure 3B:
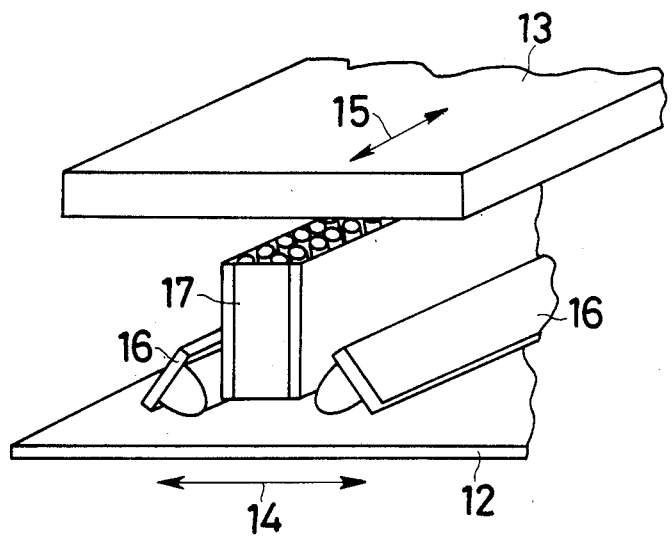

Rays of light from a light source 11 such as a fluorescent lamp pass through the original to be reproduced 12, and are then read by a photoelectric converter element array 13. The original 12 is transported in one scanning direction shown by an arrow 14. The photoelectric converter element array 13 has photoelectric converter elements U11 to Uki (with reference to FIG. 5) arranged in the vertical direction with respect to the direction 14. These photoelectric converter elements U11 and Uki are scanned in its arranging direction or another direction 14. The photoelectric converter elements D11 to Dki are closely contacted with the original 12, and receive the reflected light from the original 12. FIG. 3B is a perspective view of another embodiment of the invention. Like reference numerals are given to the same parts corresponding to the embodiment shown in FIG. 3B. Light emitting diode 16 as a light source emits light to the original 12 transported in the direction 14. The reflected light from the original 12 is then received by the photoelectric converter element 13 array via a focussing rod lens array 17. Photoelectric converter elements U11 and Uki in the photoelectric converter array 13 are scanned in the direction 15.

Figure 4:
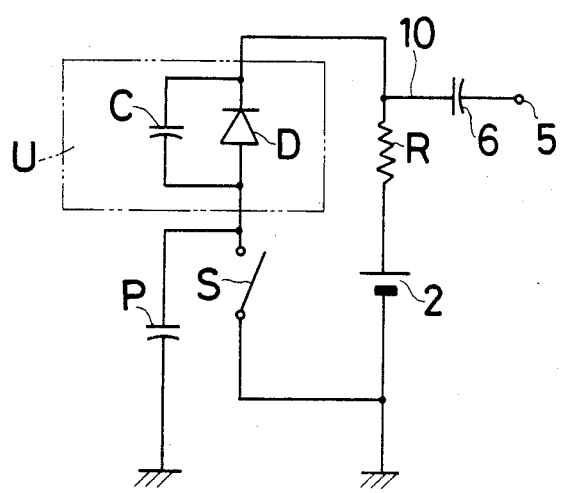
FIG. 4 is a fundamental circuit diagram of the photoelectric converter system of the electric charge storage type of an embodiment of the invention.

FIG. 4 illustrates a fundamental unit for a photoelectric converter system of the electric charge storage type according to the invention.

Figure 5:
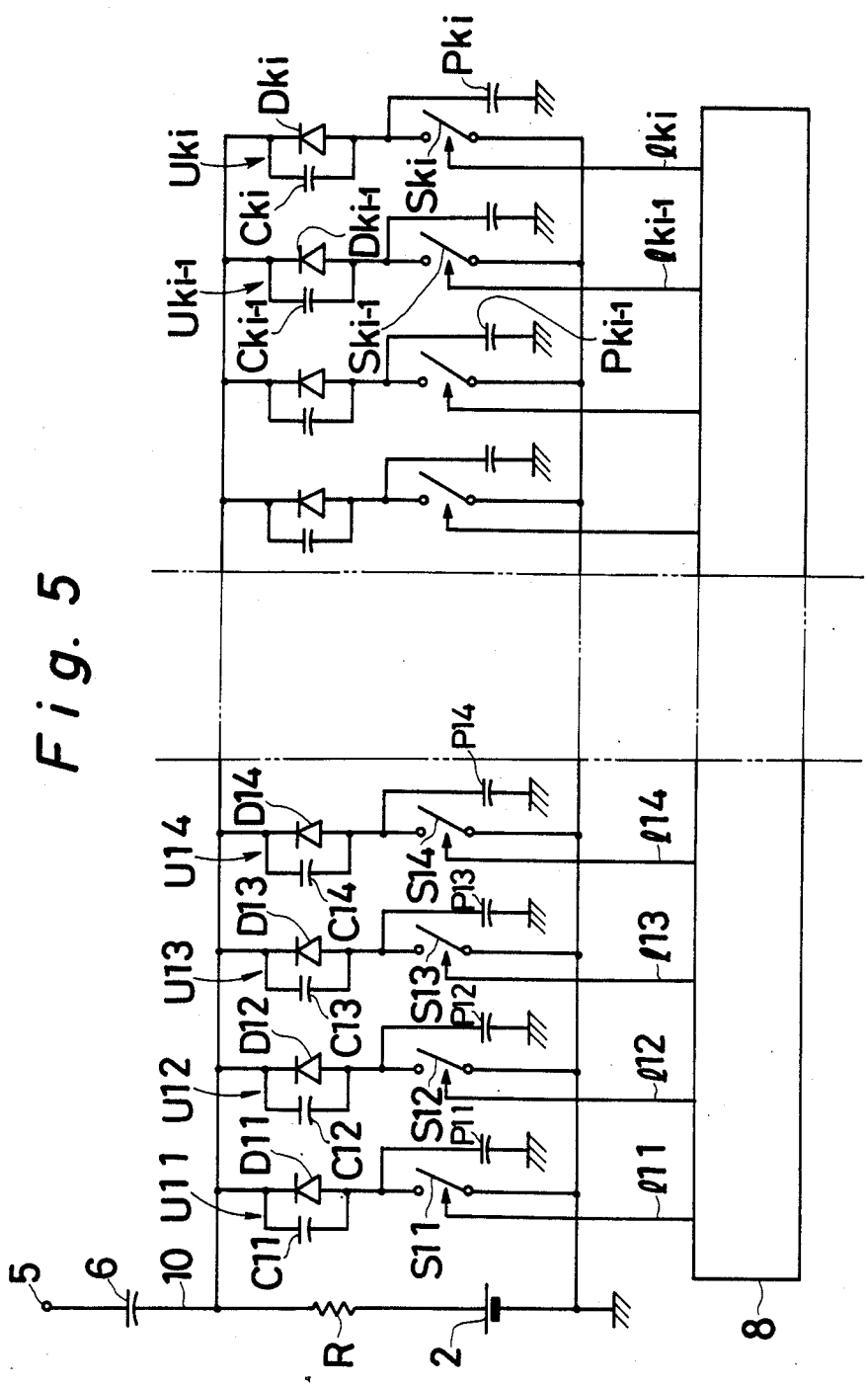
FIG. 5 is a circuit diagram of the photoelectric converter array comprising the fundamental circuit shown in FIG. 4.

FIG. 5 is an electric circuit diagram relating to a photoelectric converter element array in which a plurality of such fundamental units are arranged in one-dimensional manner.

In the unit circuit shown in FIG. 4, when a switch S is opened, a bias voltage is applied to a storage capacitor C connected in parallel with a photodiode D of a photoelectric converter element U, by a bias power supply 2. A predetermined amount of electric charge is therefore stored in the storage capacitor C. When the photodiode D receives the reflected light from the original, electric charge stored in the storage capacitor C is discharged correspondingly to the amount of photoelectric conversion. Thereafter, when the analogue switch S is suitably closed, a voltage is generated at load resistance R in such a manner that the load resistance R is charged correspondingly to the amount of discharge from the storage capacitor C, and a waveform of the voltage thus generated is sent to an output terminal 5 via the capacitor 6 through the line 10.

In such reading system of the electric charge storage type, the photoelectric converter element U is connected, at one end thereof, to an analogue switch S and at the other end thereof to the output terminal 5. Said other end is connected to the load resistance R and the bias power supply 2 in this order, and is then grounded. A coupling capacitor 6 is disposed, and the analogue switch S has a capacitance P.

In the reading fundamental circuit abovementioned, a switching noise generated at the analogue switch S is directly guided to the grounding side, and therefore not superposed onto an output signal. According to tests conducted by the inventor, the characteristics as to the contrast and the S/N ratio were not deteriorated.

FIG. 5 illustrates a photoelectric converter element array such as an image sensor of the close contact type in a facsimile.

The individual photoelectric converter elements U11 to Uki are arranged in the direction 15 (with reference to FIGS. 3A and 3B as described above), while the original to be reproduced 12 is transported in the direction 14. The photoelectric converter elements U11 to Uki are adapted to successively detect the original 12 in the direction 15. Namely, signals converted by one-dimensional photodiodes D11 to Dki are successively picked up in time sequence and scanning pulses from the shift register 8 are applied to the analogue switches S11 to Ski through respective control logic signal lines l11 to lki, thereby successively closing the switches S11 to Ski. The storage capacitors C11 to Cki are then charged again. Corresponding to the amount of such charge, a voltage is generated at the load resistance R. A signal corresponding to such voltage is sent to the output terminal 5. The switches S11 to Ski are sequentially closed during reading performance as described above, and when one of the switches is closed, the remaining switches are opened.

According to the circuit construction of this photoelectric converter element array, the output signals from the respective photoelectric converter elements U11 to Uki are sent to the output terminal 5 through the output line 10 and the coupling capacitor 6 commonly used for all photoelectric converter elements. When the wiring pattern shown in FIG. 5 is actually formed, the output line 10 is not located adjacent the control logic signal lines l11 to lki. Noise from the control logic signal lines l11 to lki are therefore not introduced into the output line 10.

Figure 6:
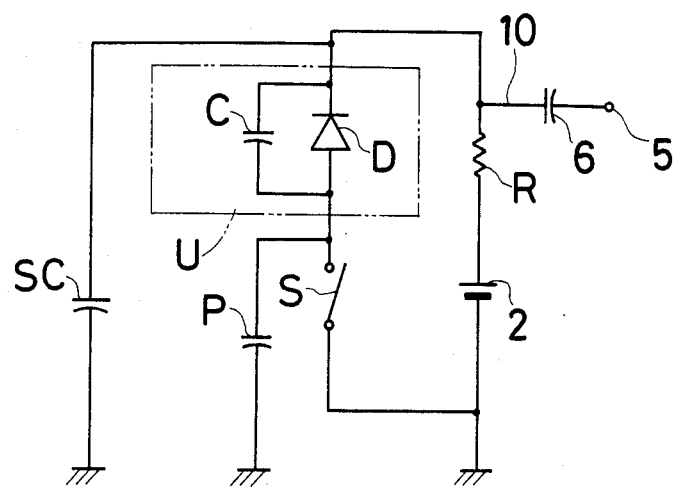
FIG. 6 is a fundamental circuit diagram of the photoelectric converter system of the electric charge storage type.
Figure 7:
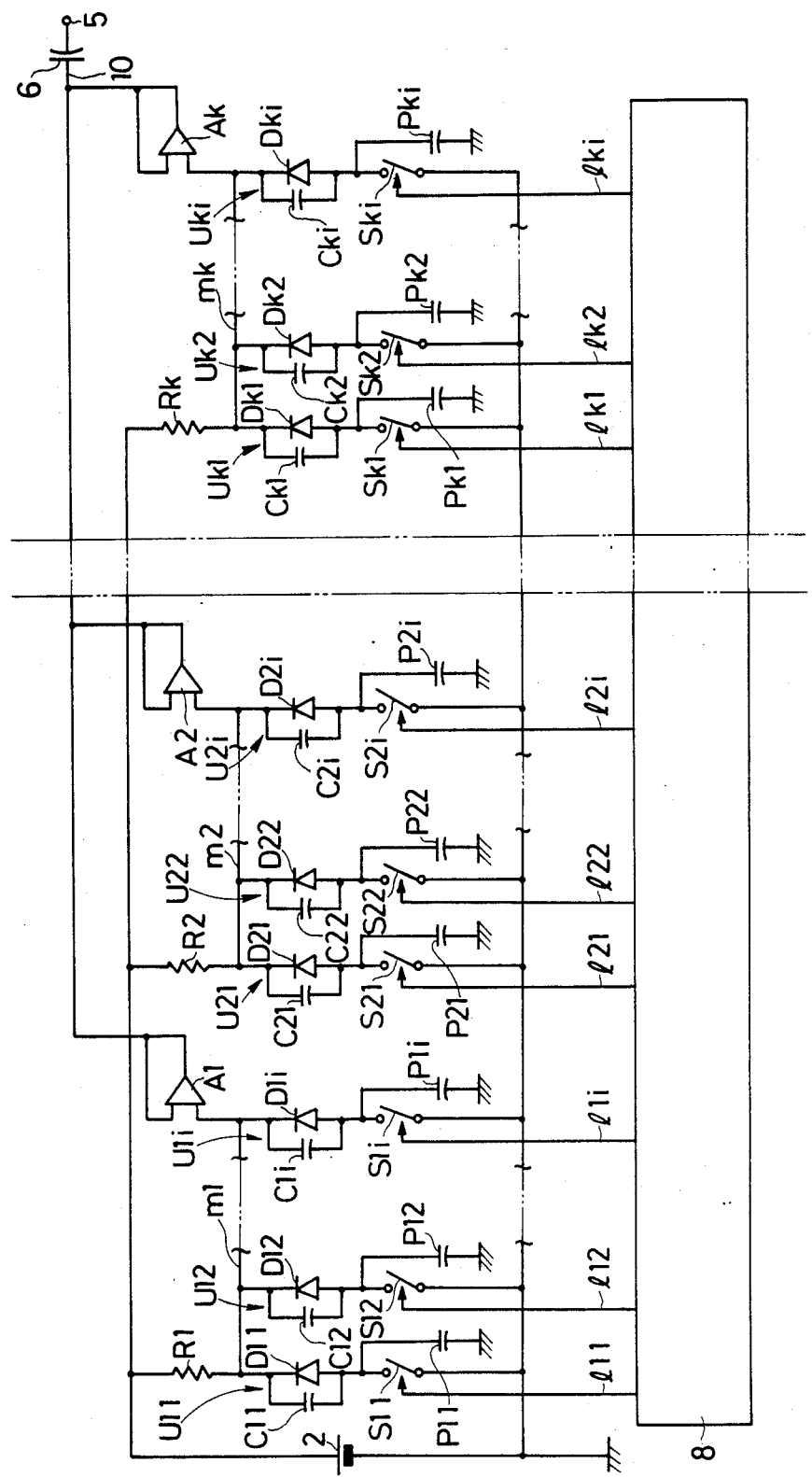
FIG. 7 is a circuit diagram of the photoelectric converter device comprising the fundamental circuit diagram shown in FIG. 6.

FIGS. 6 and 7 illustrate another embodiment of the invention.

FIG. 6 shows fundamental circuit of the electric charge storage type. When an analogue switch S is closed, a voltage V is applied to a storage capacitor C by a bias power supply 2.

Electric charge shown in the following Eq. (1) is therefore stored. Like reference numeral is given to a capacitance of the storage capacitor C.

$$Q = C \cdot V \tag{1}$$

When the analogue switch S is opened, a voltage V is applied to the storage capacitor C and a capacitance P (having a capacity Cin) of the analogue switch S. Currents from the storage capacitor C, i.e., a current Iw for the white original to be reproduced, and a current Ib for the black original to be reproduced, are expressed as below:

$$Iw = \frac{1}{Rw} \times \frac{C}{C + Cin} \times V \times e^{-\frac{t}{Rw(C+Cin)}} \tag{2}$$

$$Ib = \frac{1}{Rb} \times \frac{C}{C + Cin} \times V \times e^{-\frac{t}{Rb(C+Cin)}} \tag{3}$$

Where Rw and Rb are the values of resistance generated when discharge is made from the photoelectric converter element U respectively for the white original and the black original, and it is a period of time which has passed from the start of such discharge.

Electric charges Qw and Qb discharged for a reading cycle T respectively for the white original and the black original are expressed as below:

$$Qw = \int_0^T Iw\, dt = V \times C \times \left(1 - e^{-\frac{T}{Rw(C+Cin)}}\right) \tag{4}$$

$$Qb = V \times C \times \left(1 - e^{-\frac{T}{Rb(C+Cin)}}\right) \tag{5}$$

When the magnitude of a stray capacitance SC is C2, a voltage Sw of the signal for the white original immediately after the analogue switch S has been closed to flow a current from the stray capacitance SC to the storage capacitor C, is expressed as below:

$$Sw = V - \frac{CV - Qw + C2V}{C2 + C} = \frac{Qw}{C2 + C} \tag{6}$$

When a plurality of photoelectric converter elements U11 to Uki are used as will be described with reference to Fig. 7 and the number is n, C2 is expressed as below:

$$C2 = \frac{C \cdot Cin}{C + Cin} (n - 1) \tag{7}$$

Sw is therefore expressed as below:

$$Sw = \frac{C + Cin}{C + n \cdot Cin} \times V \times \left(1 - e^{-\frac{T}{Rw(C+Cin)}}\right) \tag{8}$$

Figure 8:
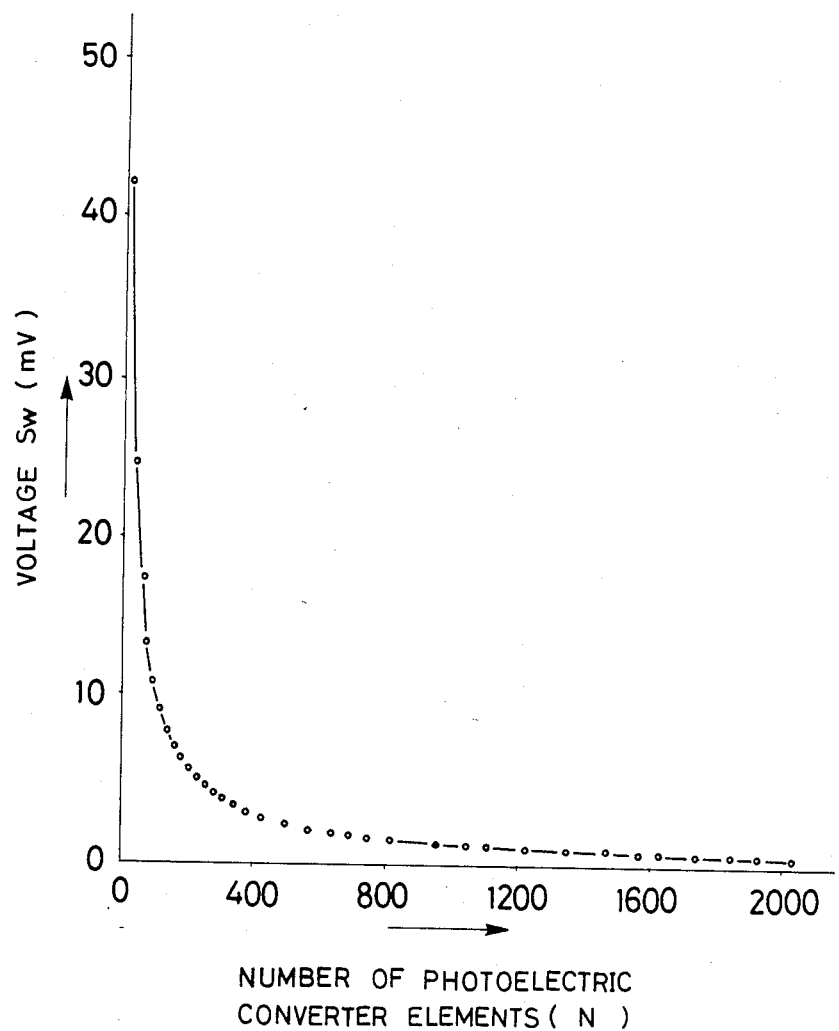
FIG. 8 is a graph showing the relation between the number of the photoelectric converter elements (N) and the voltage Sw (mV)

Eq. (8), which represents the relation between n for the number of the photoelectric converter elements and the voltage Sw, is diagramatically shown in FIG. 8. From this figure, it can be understood that the voltage Sw rapidly decreases with increase in number of the photoelectric converter elements.

Similarly, a voltage Sb of a signal for the black original is expressed as below:

$$Sb = \frac{C + Cin}{C + n \cdot Cin} \times V \times \left(1 - e^{-\frac{T}{Rh(C + Cin)}}\right) \quad (9)$$

It is understood from the foregoing that the voltages Sw and Sb are decreased, according as the number n of the photoelectric converter elements connected in parallel is increased.

With reference to FIG. 7, the description will then be made of an embodiment of the invention in which the number of photoelectric converter elements connected in parallel is decreased. The photoelectric converter elements in the respective groups U11 to U1i, U21 to U2i, ..., Uk1 to Uki have one ends thereof connected respectively with common lines m1 to mk.

According to the construction shown in FIG. 7, a predetermined number (k×i) of the photoelectric converter elements are electrically divided into a plurality K of groups, and the respective groups have buffer amplifiers A1 to Ak and load resistances R1 to Rk as signal transferring means.

When the switches S11 are opened, a bias voltage is applied to storage capacitor C11 connected to photodiodes D11, by a bias power supply 2. The photodiodes D11 receive the reflected light from the original, and photoelectric conversion is then made corresponding to the amount of received light. Electric charge stored in the storage capacitor C11 is discharged correspondingly to the amount of such photoelectric conversion.

In an image sensor of the close contact type in a facsimile, such photoelectric converter element array 13 is arranged in the direction 15 as shown in FIGS. 3A and 3B. While the original 12 is transported in the direction 14, the photoelectric converter elements U11 to Uki successively detects the original image in the direction 15. Scanning pulses from a shift register 8 are applied to the analogue switches S11 to Ski respectively corresponding to the photodiodes D11 to Dki arranged in a one-dimensional manner, thereby successively closing the switches S11 to Ski. The storage capacitors C11 to Cki are then charged again. According to the amount of such charge, a voltage is generated at the load resistances R1 to Rk disposed corresponding to each of photoelectric converter element groups, and such voltage is supplied to the output terminal 5 through the buffer amplifiers A1 to Ak.

The buffer amplifiers A1 to Ak corresponding to each of the photoelectric converter element groups serves to prohibit currents out of other photoelectric converter groups from entering into its photoelectric converter element group. A bad capacity influence is not therefore exerted upon the photoelectric converter element groups. Since the buffer amplifiers A1 to Ak have high input impedance and low output impedance, they serve to prohibit electric signals from being transmitted from the output terminal 5 to the respective photoelectric converter elements U11 to Uki.

With the increase in number k of signal transferring means R1 to Rk and A1 to Ak in the predetermined number of photoelectric converter element array, the number i of photoelectric converter elements in each group may be decreased (k·i>i). As a result, the voltages Sw and Sb of the detected signals are increased and the noise components are relatively decreased, thereby greatly improving the S/N ratio.

When a fluorescent lamp is used as a light source 11 for illuminating the original to be reproduced as shown in FIG. 3A, there are provided different intensities of illumination at both the end portions and the center portion of the lamp as shown in FIG. 9. An output signal of a higher level is supplied with a greater intensity of illumination. It is therefore not possible to obtain the voltages Sw and Sb of the output signals having a uniform level from the entire photoelectric converter element array.

The present invention may provide a very effective solution for such problem. According to the calculating equations above-mentioned, when the number i of photoelectric converter elements in each group is decreased, the levels of the voltages Sw and Sb of the output signals in each photoelectric converter element group become high. In this connection, there is decreased to a greater extent the number of photoelectric converter elements of the groups located in the area in the vicinity of both the ends of the fluorescent 11 where illumination is made with a small intensity of illumination than the number of photoelectric converter elements of the groups located in the area in the vicinity of the central portion of the fluorescent 11. Such decrease in the number of the elements can compensate decrease in an intensity of illumination. In this case, the gains of the buffer amplifiers A1 to Ak corresponding to each group are adapted to be equal, and the resistance values of the resistances R1 to Rk are also adapted to be equal. Accordingly, the voltage Sw or Sb of the detected signals having a substantially equal level may be obtained from all photoelectric converter elements.

As another embodiment of the invention, the signal transferring means may be adapted so as to have a function of equalizing the levels of output signals. With such adaptation, the same effect as above-mentioned may be achieved. For that purpose, for example, the gains of the buffer amplifiers A1 to Ak are arranged to be high in the area with a small intensity of illumination, while the gains of the buffer amplifiers A1 to Ak are chosen to be low in the area with a great intensity of illumination. In this case, the resistance values of R1 to Rk of each group are adapted to be equal, and the number i of the photoelectric converter elements U11 to Uki in each group is equally chosen.

As still another embodiment of the invention, the resistances R1 to Rk have resistance values thereof decreased in the area where the intensity of illumination of the light source 11 is made small, while resistance values of the resistances R1 to Rk are chosen to be high in the area where the intensity of illumination is made great. In this case, the number i of the photoelectric converter elements U11 to Uki in each group is equally chosen, and the gains of the buffer amplifiers A1 to Ak of each group are adapted to be equal. Besides, the invention is not restricted to the above mentioned embodiments. For example, the buffer amplifiers A1 to Ak may be substituted by diodes, difference-amplifiers, or the like for photoelectric converter element groups, inasmuch as such photoelectric converter element groups do not exert a bad capacitance influence on an element group being actuated to read out.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A document-reading apparatus comprising:
a photo-electric converter unit having a photo-electric diode, and a charge storing means connected in parallel to the photo-electric diode;
a switch having one end connected to one end of the photo-electric converter unit;
a DC power supply having one end connected to the other end of the switch, and directionally-coupled to supply a voltage in reverse bias across the photo-electric diode; and
output means interposed between the other end of the photo-electric converter unit and the other end of the DC power supply for detecting a reading output signal to be supplied from the connecting point of the photo-electric converter unit and the output means.

2. A document-reading apparatus as claimed in claim 1, wherein there are further provided:
a plurality of series circuits connected to each other in parallel, each of which has a photo-electric converter unit and a switch; and
means for scanning the switches of the series circuits to turn them on and off in a successive sequence of time.

3. A document-reading apparatus comprising:
(A) a plurality of groups (1 to k) of fundamental circuits, each of which comprises:
(i) a plurality of fundamental circuits (1 to i) connected to each other in parallel, each fundamental circuit comprising:
(a) a photo-electric converter unit $U_{ki}$ having a photo-electric diode $D_{ki}$, and a charge storing means $C_{ki}$ connected in parallel to the photo-electric diode $D_{ki}$, and
(b) a switch $S_{ki}$ having one end connected to one end of the photo-electric converter unit $U_{ki}$,
(ii) means $A_1$ to $A_k$ for supplying a reading output signal each having an input end commonly connected to the other end of photo-electric converter units $U_{k1}$ to $U_{ki}$ within the corresponding group k of fundamental circuits, and having an output end connected to supply a reading output signal, the output ends of the reading output signal supplying means $A_1$ to $A_k$ of the groups of fundamental circuits being connected commonly to each other, and
(iii) impedance means $R_1$ to $R_k$ each having one end commonly connected to the other end of the photo-electric converter units $U_{k1}$ to $U_{ki}$ within the corresponding group k of fundamental circuits for detecting the reading output signal supplied from the connecting point of the other end of each photo-electric converter unit $U_{k1}$ to $U_{ki}$;
(B) A DC power supply having one end connected commonly to the other end of each switch $S_{11}$ to $S_{ki}$ and having the other end of the power supply connected commonly to the other end of each impedance means $R_1$ to $R_k$, and directionally-coupled to supply a voltage in reverse across the photo-electric diodes $D_{11}$ to $D_{ki}$; and
(C) means for scanning the switches $S_{11}$ to $S_{ki}$ to turn them on and off in a successive sequence of time.

4. A document-reading apparatus as claimed in claim 1, 2 or 3, wherein the other end of the switch is electrically grounded.

5. A document reading apparatus as claimed in claim 3, wherein the output signal supplying means $A_1$ to $A_k$ prohibit currents out of each corresponding group k of fundamental circuits from entering into the other groups of fundamental circuits.

6. A document reading apparatus as claimed in claim 5, wherein the output signal supplying means comprises a buffer amplifier.

7. A document reading apparatus as claimed in claim 3, wherein the photoelectric converter units $U_{ki}$ are arranged in a first direction intersecting at right angle with a second direction in which an original to be reproduced is transported, and each photoelectric converter unit $U_{ki}$ receive reflected light from the original illuminated by a light source.

8. A document reading apparatus as claimed in claim 7, wherein the number of photoelectric converter units in the groups of fundamental circuits located in a first area with a relatively small illumination intensity by the light source is chosen to be smaller than the number of the photoelectric converter units in the groups of fundamental circuits located in a second area with a relatively great illumination intensity by the light source.

9. A document reading apparatus as claimed in claim 7, wherein the gain of the buffer amplifier of the groups of fundamental circuits located in the first area with the relatively small illumination intensity by the light source is chosen to be higher than the gain of the buffer amplifiers of the groups of fundamental circuits located in the second area with the relatively great illumination intensity by the light source.

10. A document reading apparatus as claimed in claim 7, wherein the resistance value of the impedance means of the groups of fundamental circuits located in the first area with the relatively small illumination intensity by the light source is chosen to be lower than the resistance value of the impedance means of the groups of fundamental circuits located in the second area with the relatively great illumination intensity by the light source.

11. A document reading apparatus having a plurality of fundamental circuits for reducing output noise, each fundamental circuit comprising:
a photoelectric converter unit having a photoelectric diode and means for storing electric charges, the photoelectric diode and charge storing means are coupled in parallel;
a switch;
a DC power supply; and
an impedance means for providing load resistance;
wherein the photoelectric converter unit, the switch, the DC power supply and the impedance means are coupled in series in that order in a loop, wherein the DC power supply applies a voltage in reverse bias across the photoelectric unit, and wherein an output voltage signal is readable at a point between the impedance means and the photoelectric converter unit.

12. A document reading apparatus according to claim 11, wherein the fundamental circuits are coupled in parallel with each other by commonly coupling corresponding point between the switch and the DC power supply of each fundamental circuit and commonly coupling the point where output voltage signal is read, whereby the output signals from the fundamental circuits are commonly connected.

13. A document reading apparatus according to claim 12, further comprising means for actuating the switching means in a predetermined time sequence.

14. A document reading apparatus according to claim 11 wherein;
the fundamental circuits are arranged in groups, each group comprising a predetermined number of fundamental circuits coupled in parallel with each other by commonly coupling corresponding point between the switch and the DC power supply of each fundamental circuit and commonly coupling the point where output voltage signal is read; and
each group has a common signal transferring means for prohibiting currents out of one group from entering into another group, each signal transferring means having an input commonly coupled to the output signals of the fundamental circuits within the group, and having an output commonly coupled to the outputs of the signal transferring means of the other groups.

15. A document reading apparatus according to claim 14 further comprising means for actuating the switching means in a predetermined time sequence.

16. A document reading apparatus according to claim 15 wherein the signal transferring means comprises a buffer amplifier.

17. A document reading apparatus according to either claim 11, 13, 15 or 16 wherein the switch is electrically grounded at a point direct from the switch and between the switch and the power supply, whereby any signal noise generated at the switch is guided directly to ground.

* * * * *